United States Patent
Cheng et al.

(10) Patent No.: US 7,538,903 B2
(45) Date of Patent: May 26, 2009

(54) METHOD FOR SCANNING BY USING A VIRTUAL FRAME HOLDER

(76) Inventors: Stone Cheng, 187, Ping-Teng Rd., Tzu-Kuan, Kaohsiung (TW); Mei-Cheng Ho, 12, Lane 188, Han-Min Road, Kao-Hsiung City (TW)

(*) Notice: Subject to any disclaimer, the term of this patent is extended or adjusted under 35 U.S.C. 154(b) by 666 days.

(21) Appl. No.: 10/192,511

(22) Filed: Jul. 11, 2002

(65) Prior Publication Data

US 2004/0008384 A1 Jan. 15, 2004

(51) Int. Cl.
*G06F 15/00* (2006.01)
*G06K 1/00* (2006.01)

(52) U.S. Cl. ............... 358/1.18; 358/452; 358/453; 358/462; 382/289; 382/173

(58) Field of Classification Search ............... 358/1.18, 358/468, 445, 446, 447, 461, 487, 497, 1.2, 358/1.14, 1.15, 1.6, 452, 453; 382/317, 282, 382/319, 289, 236, 209, 173
See application file for complete search history.

(56) References Cited

U.S. PATENT DOCUMENTS

| | | | | |
|---|---|---|---|---|
| 5,619,738 A * | 4/1997 | Petruchik et al. | ............ | 396/311 |
| 5,694,315 A | 12/1997 | Huang et al. | | |
| 5,818,976 A * | 10/1998 | Pasco et al. | ............ | 382/289 |
| 5,880,858 A * | 3/1999 | Jin | ............ | 358/487 |
| 5,881,214 A * | 3/1999 | Morisawa et al. | ............ | 358/1.18 |
| 5,901,253 A * | 5/1999 | Tretter | ............ | 382/289 |
| 5,970,183 A * | 10/1999 | Amemiya et al. | ............ | 382/282 |
| 6,151,426 A * | 11/2000 | Lee et al. | ............ | 382/319 |
| 6,282,314 B1 * | 8/2001 | Sugiura et al. | ............ | 382/173 |
| 6,388,778 B1 * | 5/2002 | Ko-Chien | ............ | 358/497 |
| 6,397,369 B1 * | 5/2002 | Despain et al. | ............ | 714/798 |
| 6,411,731 B1 * | 6/2002 | Saito | ............ | 382/173 |
| 6,433,883 B1 * | 8/2002 | Kajita | ............ | 358/1.14 |
| 6,493,677 B1 * | 12/2002 | von Rosen et al. | ............ | 705/27 |
| 6,577,409 B1 * | 6/2003 | Barker et al. | ............ | 358/468 |
| 6,603,581 B2 * | 8/2003 | Lam et al. | ............ | 358/474 |
| 6,704,467 B2 * | 3/2004 | Uchida | ............ | 382/311 |
| 6,738,154 B1 * | 5/2004 | Venable | ............ | 358/1.15 |
| 6,980,332 B2 * | 12/2005 | Simske | ............ | 358/445 |
| 7,057,753 B1 * | 6/2006 | Kajita et al. | ............ | 358/1.15 |
| 7,099,511 B2 * | 8/2006 | Shinagawa et al. | ............ | 382/236 |
| 7,136,182 B2 * | 11/2006 | Kajita et al. | ............ | 358/1.15 |
| 2001/0040685 A1 * | 11/2001 | Winter et al. | ............ | 358/1.6 |
| 2002/0036780 A1 * | 3/2002 | Nakamura | ............ | 358/1.2 |

* cited by examiner

*Primary Examiner*—Edward L Coles
*Assistant Examiner*—Satwant K Singh
(74) *Attorney, Agent, or Firm*—Stolowitz Ford Cowger LLP

(57) ABSTRACT

Embodiments of a scanning method utilizing a virtual frame holder are disclosed. In one embodiment, a method includes using a computer drive scan program to perform a scanning preview, determining whether to utilize a frame holder specification parameter data source. In this embodiment, the frame holder specification is selected from the frame holder specification parameters data source. In an additional embodiment, a frame holder specification parameter is created from the frame holder specification.

30 Claims, 3 Drawing Sheets

METHOD FOR SCANNING BY USING A VIRTUAL FRAME HOLDER

BACKGROUND

1. Field

Embodiments of the claimed subject matter relate to a scanner and a scanning method, more specifically, to a scanning method using a virtual frame holder.

2. Description of the Prior Art

A scanner is a device that transforms a static object into a digital image. Different types of scanners principally include the palm scanner, the paper feed scanner and the flatbed scanner. Typically, the palm scanner was a low-level product that required the user to physically hand move the scanner to acquire the image. The palm scanner typically offered poor resolution and scanning effects, thus eliminating the palm scanner through competition. The feed paper scanner is similar in structure to the common fax machine, with its price and resolution lying between the palm scanner and the flatbed scanner. The flatbed scanner is a high quality scanner, with resolution reaching upwards of 1200 DPI(Dot Per Inch), making it the leading product on the market. The pixel numbers per inch, or DPI determines the resolution.

Furthermore, the working principles and procedures of a scanner include many steps. Firstly, a light tube driven by a motor drive and a drive belt irradiates the light to a photograph and reflects the light; the light is then transmitted to CCD sensor devices through a lens. In a traditional scanner, the red, blue and green colors are analyzed separately by scanning three times. With the present technique, the red, blue and green color can be analyzed simultaneously with only one scan. However, a professional image scanner still scans three times in consideration of image resolution. In the scanning process, a CCD sensor device works just like the sensor cells of the human eye. The different light intensity is transferred to different intensity currents, and then the analog signals are transferred to a digital signal through an A/D converter to make it readable for a computer. The digital signals are then transferred to a screen by a computer connection wire, thereby showing the photographic image on the computer screen.

U.S. Pat. No. 5,694,315 titled "Method for Scanning Multiple Images in One Scanning Process", discloses the use of a different frame holder, as the method for forming each separate image pattern. In the traditional technique of scanning the object image pattern, the frame holder is used to load the object image pattern. The user must buy the positive and negative film frame holders provided by the scanner factory owner. The frame holder specifications are restricted to a specific style, so other size positive and negative film frame holders can not be selected. Therefore, different size object image patterns can not be processed.

For the reasons above, it is desired to find a new scanning method that allows for utilization of virtual frame holders.

SUMMARY

Owing to the drawbacks that the traditional frame holder presents in the prior art, the claimed subject matter discloses a scanning method using a virtual frame holder, allowing the user to setup the desired scanning specifications of the object image.

The main object of the claimed subject matter is to provide a scanning method using a virtual frame holder, allowing the user to setup the desired scanning specifications of the object image.

Another object of the claimed subject matter is to provide a scanning method by using a virtual frame holder that allows the user to setup as many different specifications that are required of an object image at one time.

A further object of the claimed subject matter is that the virtual frame holder can be used without the user buying the traditional non-flexible frame holder.

According to the above object, the claimed subject matter discloses a scanning method by using a virtual frame holder. The method includes the use of a computer running a scan drive program to perform a preview scan of an object, and showing the scanned object image pattern on a screen. Next, the use of a frame holder is determined according to the object image pattern. When setting the frame holder specification parameters it is determined whether the frame holder specification parameters data source can be used. If the determination is yes, the frame holder specification is selected from the frame holder specification parameters data source. If the determination is no, a frame holder specification of the frame holder specification parameters is created. By using the computer, a scan area and the scan position are automatically calibrated by using a drive scan program. Finally, by using a drive scan program the object image pattern is scanned.

Furthermore, the claimed subject matter discloses a method for creating a virtual frame holder. The method includes inputting a plurality of scanned image area specifications of the object image pattern into the parameters of a drive scan program. Then the spacing between two or more image areas is input into the parameters of a drive scan program. Next the number of image areas is input into the parameters of a drive scan program, to complete the creation of a virtual frame holder. Finally, it is determined whether the virtual frame holder is to be stored into the data source. If the determination is yes, a storing action is performed. If no, an ending action is performed.

The foregoing aspects and many of the attendant advantages of this claimed subject matter will become more readily appreciated as the same becomes better understood by reference to the following detailed description, when taken in conjunction with the accompanied drawings.

BRIEF DESCRIPTION OF THE DRAWINGS

The foregoing aspects and many of the attendant advantages of this claimed subject matter will become more readily appreciated as the same becomes better understood by reference to the following detailed description, when taken in conjunction with the accompanying drawings, wherein:

DESCRIPTION OF THE PREFERRED EMBODIMENT

Some sample embodiments of the claimed subject matter will now be described in greater detail. Nevertheless, it should be noted that the present claimed subject matter can be practiced in a wide range of other embodiments besides those explicitly described, and the scope of the claimed subject matter is expressly not limited except as specified in the accompanying claims.

The method of using the virtual frame holder in the claimed subject matter enables the user to create virtual frame holder specifications. When the user drags the virtual frame holder to the image pattern, the scan position will be calibrated. Moreover, a data source is used to store the created virtual frame holder specification, and the data source can be opened and used at any time by the user.

The main steps of the claimed subject matter includes creating a scanned image pattern specification wherein the scanned image pattern has one or more image areas, and creating a spacing distance in the lower left of lower right corner of the image areas. The amount and frame holder numbers of the virtual frame holder must then be assigned. The virtual frame holder is then finished and applied to the scanned image pattern. Scan positions are calibrated automatically and the scanned image pattern is shown. Furthermore, in the claimed subject matter, many different virtual frame holders can be used simultaneously, and the created virtual frame holder may be stored into the data source. In practical applications, the claimed subject matter includes the steps for creating the virtual frame holder specifications and the scanning method for using the virtual frame holder.

In the claimed subject matter, the steps for using the virtual frame holder include pre-scanning an object to obtain an object image pattern. It is then determined if the data source of the virtual frame holder can be applied to the scanned image pattern. The virtual frame holder is then applied to the scanned image area, and the scanned image pattern and the virtual frame holder is automatically calibrated. The scanned image pattern is shown on the scan area. Finally, the object image pattern is scanned. When the virtual frame holder data source can be applied to the scanned image pattern, the frame holder specification is selected from the virtual frame holder data source. When the virtual frame holder data source can not be applied to the scanned image pattern, the frame holder specifications must be created. In the claimed subject matter, the steps for creating the virtual frame holder specifications include determining a scanned image pattern size, determining image areas of the image pattern, and creating an end position of the image areas of the image pattern. The required image area numbers of the virtual frame holder are set as the virtual frame holder data. The virtual frame holder data is then stored. The above end positions of the image areas are in the lower left or lower right corner of the image areas.

Figure 1:
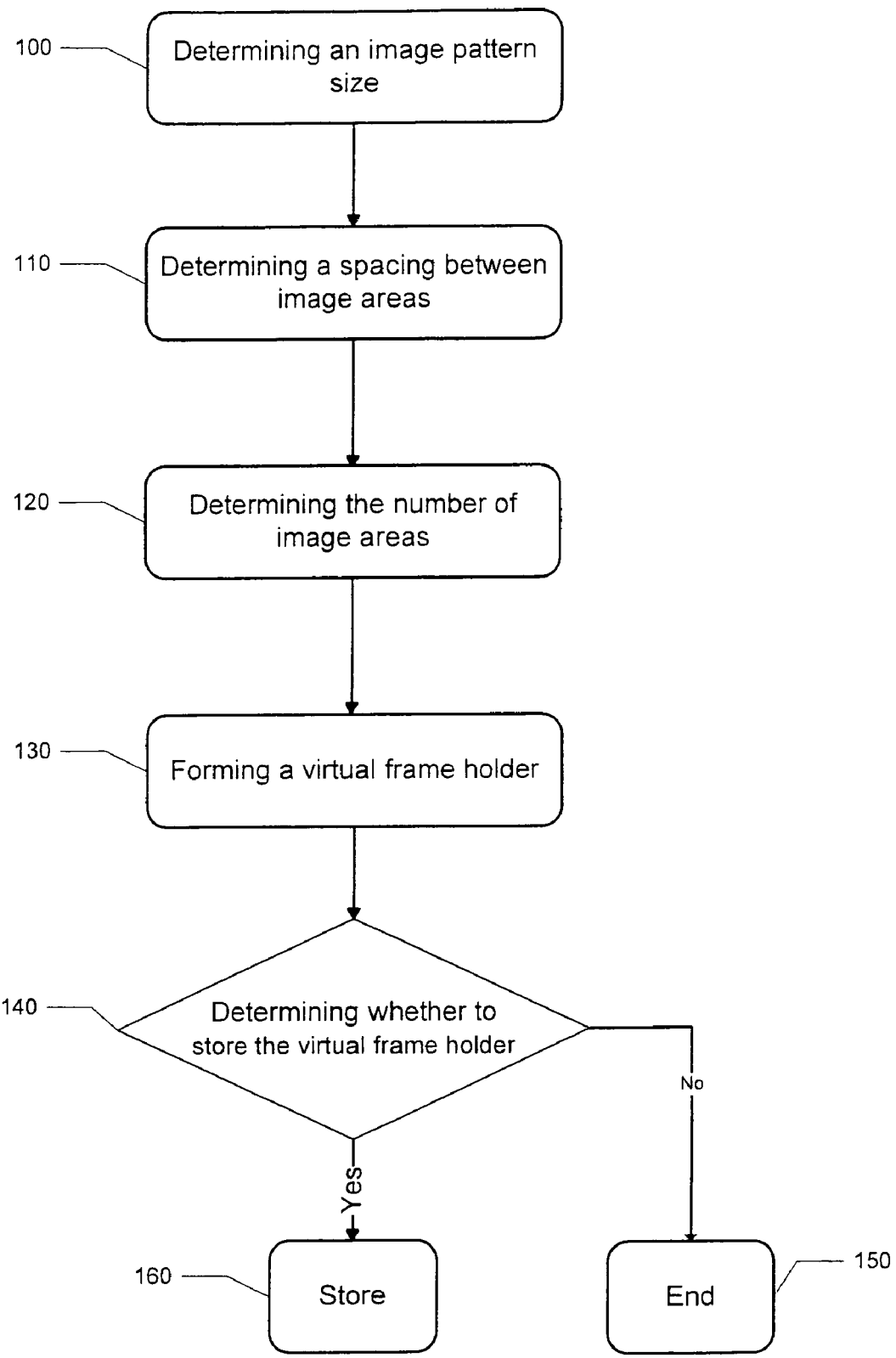
FIG. 1 is the flow chart of a method of creating a virtual frame holder according to the claimed subject matter.

Referring to FIG. 1, is a flow chart for a method in creating a virtual frame holder according to the claimed subject matter. The step 100 represents determining a scanned image pattern size. This is a plurality of scanned image area specifications of the scanned object image pattern that are input into the parameters of a drive scan program. Step 110 represents determining spacing between image areas of the object image pattern. This is the spacing between the image areas that are input into the parameters of the drive scan program. The image areas, for example, are rectangular frames, the spacing between the rectangular frames depends on the amount of rectangular frames and the configuration between the rectangular frames. Next, step 120 represents determining numbers assigned to the image areas of the virtual frame holder. This is the amount of the image areas input into the parameters of the drive scan program. If the image areas, for example, are rectangular frames, the spacing between the rectangular frames depends on the amount of the rectangular frames and the configuration between the rectangular frames. Performing step 100, step 110 and step 120, completes the creation of the virtual frame holder.

The numbers of the image areas are the amount of frames, and the frames comprise a plurality of different size frames.

Step 140 represents determining whether the virtual frame holder is stored into a data source, wherein the completed virtual frame holder stored forms the data source of the computer memory device. If the determination of step 140 is yes, step 150 of the storing action is performed, and if the determination of the step 140 is no, step 160 of the ending action is performed.

Figure 2:
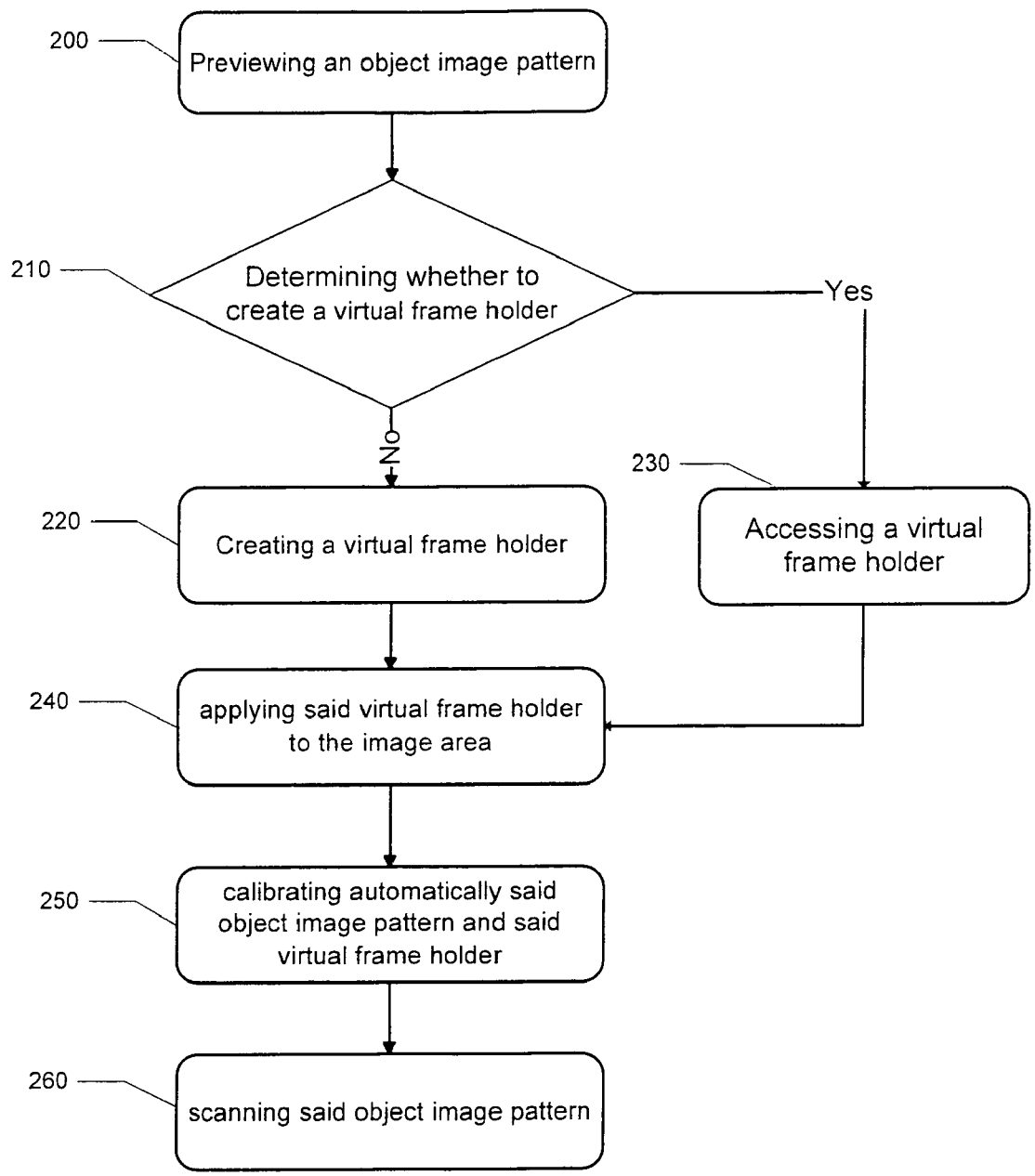
FIG. 2 is the flow chart of a scanning method by using a virtual frame holder according to the claimed subject matter.

Referring to FIG. 2 shows the flow chart of a scanning method using a virtual frame holder according to the claimed subject matter. The step 200 represents the scan pre-view from a computer drive scan, thereby performing a pre-view of the object image pattern that shows the object image pattern of the frame holder on the screen. Step 210 represents determining whether to create a virtual frame holder, wherein the desired specification parameters of the needed frame holder is selected and in fact, step 210 uses the frame holder specification parameters. Next, step 220 represents creating the virtual frame holder, wherein the completed virtual frame holders are stored into the computer memory device for future use. If the determination of step 210 is yes, step 230 is performed by accessing the frame holder specification. This means the virtual frame holder specification is selected from the virtual frame holder data source. If the determination of step 210 is no, step 220 is performed to create the virtual frame holder. Step 220 for creating the virtual frame holder is described as the steps of the FIG. 1.

The frame holder specification parameters comprise the numbers of the image area of the object image pattern, the image area size and the spacing between the image areas. The numbers of the image areas are the amount of frames, and the frames comprise a plurality of different size frames.

Next, the scan setting parameters are input into the drive scan program. The scan setting parameters include scanning resolution, scanning scope, exposing time, color scanning, grayscale scanning and monochrome scanning, etc. Then step 240 represents applying the virtual frame holder to the image area. Step 250 represents calibrating the object image pattern and the virtual frame holder. The accuracy of the scan position is determined by the agreement between the scanned image pattern with the object image pattern shown by calibrating the scan area in step 250. Thus no part of the object image pattern will be lost. Finally, step 260 represents the scanning of the object image pattern. This means that the drive scan program scans the object image pattern.

Figure 3:
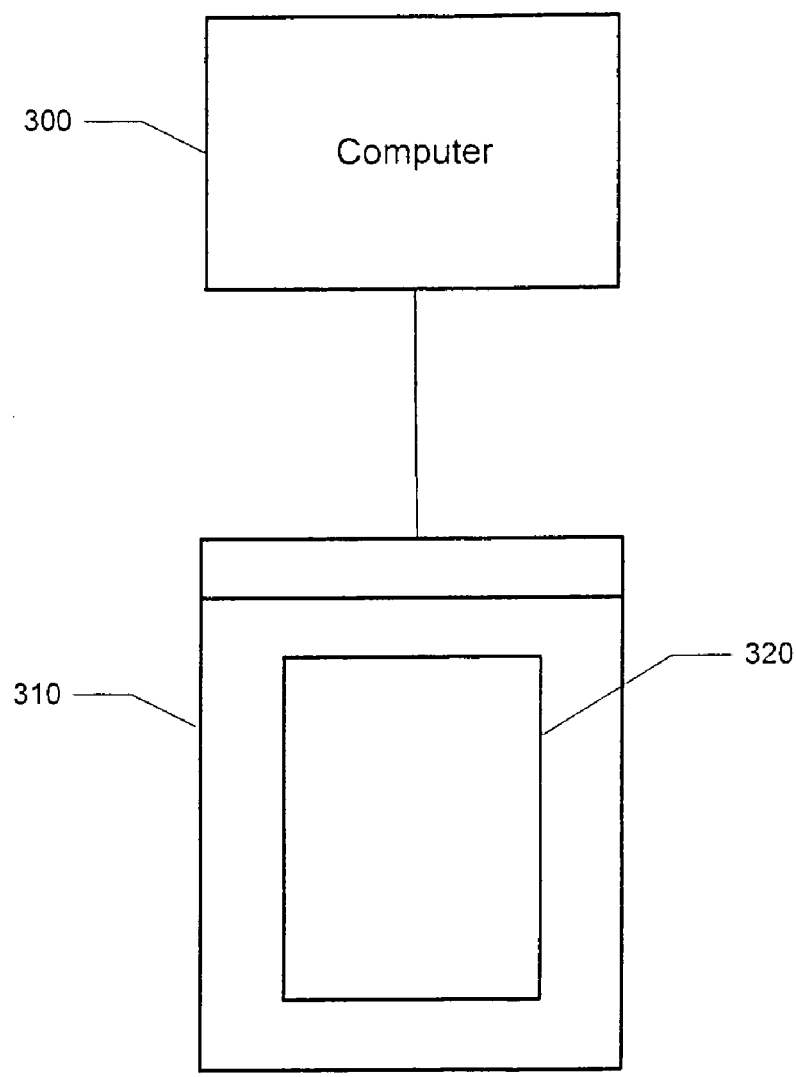
FIG. 3 is a computer and a scanner that may be employed to use a virtual frame holder according to the claimed subject matter.

Referring to FIG. 3, there is illustrated a computer and a scanner that may be employed to utilize a virtual frame holder according to at least one embodiment of the claimed subject matter. In one embodiment, computer 300 may be communicatively coupled to scanner 310. The computer 300 and the scanner 310 may be adapted to obtain a preview of a object image, and determine whether to apply a virtual frame holder. The computer 300 and the scanner 310 may be further adapted to form a virtual frame holder, and/or access data representative of a virtual frame holder, such as from a memory of the computer 300 (not shown), based at least in part on the determination. The virtual frame holder may be applied to the image area and calibrated with the object image pattern, such as illustrated by virtual frame holder 320, for example. Scanner 310 may be further adapted to scan the object image pattern by utilizing the virtual frame holder, to obtain a scanned object image.

As described by the above embodiment, the claimed subject matter provides a scanning method by using a virtual frame holder. The advantages of the claimed subject matter are in the following description. Firstly, the frame holder specification is not restricted to a specific style because a virtual frame holder performs the scan. Thus many different size films can be selected to treat the different size object image pattern. Furthermore, when using the virtual frame holder the user does not need to buy the frame holder.

As is understood by a person skilled in the art, the foregoing preferred embodiments of the claimed subject matter are illustrated for reference, rather than limiting the claimed subject matter, it is intended to cover various modifications and similar arrangements included within the spirit and scope of the appended claims, the scope of which should be a accorded the broadest interpretation so as to encompass all such modifications and similar structure. Thus, while the preferred embodiment of the claimed subject matter has been illustrated and described, it will be appreciated that various changes can be made therein without departing from the spirit and scope of the claimed subject matter.

What is claimed is:

1. A method for scanning comprising:
   pre-scanning an object image;
   identifying virtual frame holder specifications selected from a plurality of virtual frame holder specifications stored on a memory device, wherein said virtual frame holder specifications provide a spacing between each of a plurality of image areas corresponding to different areas of said object image;
   calibrating automatically said object image and said selected virtual frame holder specifications; and
   determining a scan area comprised of said plurality of image areas including said spacing there between.

2. The method of claim 1, further comprising scanning said scan area.

3. The method of claim 2, wherein said scanning is performed by a scanner communicatively coupled to said computing system.

4. The method of claim 1, wherein said virtual frame holder specifications further identify a size of each of said plurality of image areas.

5. The method of claim 1, wherein said plurality of image areas comprise all of said object image.

6. The method of claim 1, wherein said plurality of image areas comprise different sizes.

7. The method of claim 1, wherein said virtual frame holder specifications identify an end position of said plurality of image areas.

8. The method of claim 1, wherein said virtual frame holder specifications further identify a number of image areas of said object image.

9. The method of claim 8, wherein said number of image areas depends on a size of said object image.

10. An apparatus comprising:
    a scanner adapted to:
    pre-scan an object image to substantially determine an image area;
    access a virtual frame holder data source embodied on a memory device of a computing system communicatively coupled to said scanner, wherein said virtual frame holder data source specifies one or more virtual frame holders and a spacing associated with each of said one or more virtual frame holders;
    identify one or more of the virtual frame holders selected from said memory device corresponding to at least a portion of said image area;
    calibrate said image area and said plurality of virtual frame holders;
    set a scan area comprised of said one or more virtual frame holders; and
    scan said scan area.

11. The apparatus of claim 10, wherein said object image comprises a plurality of objects, and wherein each of said plurality of objects correspond to one of said virtual frame holders.

12. The apparatus of claim 11, wherein said image area comprises an outline of said plurality of objects.

13. The apparatus of claim 10, wherein said virtual frame holder data source comprises virtual frame holder specifications for one or more of said virtual frame holders.

14. An apparatus, comprising:
    a scanner communicatively coupled to a memory device, wherein said scanner is adapted to:
    pre-scan an object image pattern having a plurality of image areas;
    identify virtual frame holder specifications selected from a plurality of virtual frame holder specifications embodied on the memory device based at least in part on said pre-scan, said virtual frame holder specifications including a size and spacing associated with each of said plurality of image areas;
    determine a scan area comprised of said plurality of image areas and said spacing; and
    calibrate automatically said object image pattern and said selected virtual frame holder specifications that correspond to said plurality of image areas.

15. The apparatus of claim 14, wherein said scanner is further adapted to:
    scan said scan area including said plurality of image areas.

16. The apparatus of claim 14, wherein said scan area comprises an outline of said plurality of image areas.

17. The apparatus of claim 16, wherein said plurality of image areas comprise less than all of said object image pattern.

18. The apparatus of claim 16, wherein said virtual frame holder specifications further include a position of said plurality of image areas.

19. The apparatus of claim 16, wherein said plurality of image areas include rectangular frames.

20. An apparatus comprising:
    means for pre-scanning an object image to substantially determine an image area;
    means for accessing a virtual frame holder data source embodied on a memory device of a computing system communicatively coupled to said scanner, wherein said virtual frame holder data source specifies one or more virtual frame holders and a spacing associated with each of said one or more virtual frame holders;
    means for selecting one or more of said virtual frame holders from said memory device;
    means for calibrating said image area and said one or more virtual frame holders;
    means for setting a scan area comprised of said one or more virtual frame holders and said spacing; and
    means for scanning said scan area.

21. The apparatus of claim 20, wherein said object image comprises a plurality of objects, and wherein each of said plurality of objects corresponds to at least one of said one or more virtual frame holders.

22. The apparatus of claim 21, wherein said image area comprises an outline of said plurality of objects.

23. The apparatus of claim 20, wherein said virtual frame holder data source comprises virtual frame holder specifications including a number of said one or more virtual frame holders.

24. A method, comprising:
pre-scanning an object image, wherein said pre-scanned image comprises an object image pattern;
identifying a plurality of different image areas of said object image pattern;
identifying a spacing between each of said different image areas; and
creating a virtual frame holder specification defining said different image areas and said spacing between each of said different image areas.

25. The method of claim 24, further comprising:
calibrating said object image and said virtual frame holder specification.

26. The method of claim 25, further comprising:
determining a scan area comprised of said plurality of different image areas and said spacing there between.

27. The method of claim 24, further comprising:
identifying a size of each of said plurality of different image areas, wherein said virtual frame holder specification further defines said size of each of said plurality of different image areas.

28. The method of claim 24, further comprising:
identifying a position of each of said plurality of different image areas, wherein said virtual frame holder specification further defines said position of each of said plurality of different image areas.

29. The method of claim 24, wherein said plurality of different image areas comprise all of said object image.

30. The method of claim 24, wherein said plurality of different image areas comprise less than all of said object image.

* * * * *